United States Patent
Schleef et al.

(10) Patent No.: US 8,067,046 B2
(45) Date of Patent: Nov. 29, 2011

(54) ORAL POUCH PRODUCT INCLUDING SOLUBLE DIETARY FIBERS

(75) Inventors: Raymond R. Schleef, Germantown, MD (US); Seetharama Deevi, Midlothian, VA (US)

(73) Assignee: Philip Morris USA Inc., Richmond, VA (US)

( * ) Notice: Subject to any disclaimer, the term of this patent is extended or adjusted under 35 U.S.C. 154(b) by 506 days.

(21) Appl. No.: 12/155,633

(22) Filed: Jun. 6, 2008

(65) Prior Publication Data

US 2008/0317911 A1  Dec. 25, 2008

Related U.S. Application Data

(60) Provisional application No. 60/929,015, filed on Jun. 8, 2007.

(51) Int. Cl.
*B65B 29/02* (2006.01)
(52) U.S. Cl. ........... 426/78; 131/352; 131/111; 131/112
(58) Field of Classification Search .................... 426/78, 426/79, 80, 81, 82, 83, 84; 131/111, 112, 131/116, 117, 118, 347, 352, 353, 354, 355, 131/356, 357, 358, 359
See application file for complete search history.

(56) References Cited

U.S. PATENT DOCUMENTS

| | | |
|---|---|---|
| 307,537 A | 11/1884 | Foulks |
| 1,234,279 A | 7/1917 | Buchanan |
| 1,376,586 A | 5/1921 | Schwartz |
| 1,992,152 A | 2/1935 | Yeates |
| 2,313,696 A | 3/1941 | Yates |
| 3,067,068 A | 12/1962 | Finberg |
| 3,174,889 A | 3/1965 | Anderson et al. |
| 3,369,551 A | 2/1968 | Carroll |
| 3,600,807 A | 8/1971 | Sipos |
| 3,607,299 A | 9/1971 | Bolt |
| 3,692,536 A | 9/1972 | Fant |
| 3,757,798 A | 9/1973 | Lambert |
| 3,846,569 A | 11/1974 | Kaplan |
| 3,932,192 A | 1/1976 | Nakashio et al. |
| 4,565,702 A | 1/1986 | Morley et al. |
| 4,607,479 A | 8/1986 | Linden |
| 4,624,269 A | 11/1986 | Story et al. |

(Continued)

FOREIGN PATENT DOCUMENTS

EP      0212234 A2      7/1986

(Continued)

OTHER PUBLICATIONS

Sheen et al. "Chemical and Physical Properties of Tobacco Fiber", in: Furda, I., Unconventional Sources of Dietary Fiber, ACS Symposium Series 214, American Chemical Society, Washington, D.C. 1983, p. 251-265.*

(Continued)

*Primary Examiner* — Rena Dye
*Assistant Examiner* — Chaim Smith
(74) *Attorney, Agent, or Firm* — Buchanan Ingersoll & Rooney PC

(57) ABSTRACT

Provided is an oral pouch product including a pouch having a plurality of pores. At least one portion of soluble dietary fibers is contained in the pores of the pouch and/or coated thereon. The oral pouch product is filled with a botanical material. The oral pouch product is placed in the mouth to release the soluble dietary fibers directly into the user's mouth.

18 Claims, 1 Drawing Sheet

U.S. PATENT DOCUMENTS

| | | |
|---|---|---|
| 4,892,483 A | 1/1990 | Douglas, Jr. |
| 4,907,605 A | 3/1990 | Ray et al. |
| 4,917,161 A | 4/1990 | Townend |
| 5,167,244 A | 12/1992 | Kjerstad |
| 5,174,088 A | 12/1992 | Focke et al. |
| 5,346,734 A | 9/1994 | Wydick, Jr. |
| 5,387,416 A | 2/1995 | White et al. |
| 5,601,716 A | 2/1997 | Heinrich et al. |
| 5,773,062 A | 6/1998 | Cirigliano et al. |
| 5,806,408 A | 9/1998 | DeBacker et al. |
| 5,921,955 A | 7/1999 | Mazer et al. |
| 5,927,052 A | 7/1999 | Nippes et al. |
| 5,997,691 A | 12/1999 | Gautam et al. |
| 6,021,624 A | 2/2000 | Richison et al. |
| 6,135,120 A | 10/2000 | Löfman et al. |
| 6,143,316 A | 11/2000 | Hayden et al. |
| 6,146,655 A | 11/2000 | Ruben |
| 6,162,516 A | 12/2000 | Derr |
| 6,287,612 B1 | 9/2001 | Mandava et al. |
| 6,455,068 B1 | 9/2002 | Licari |
| D489,606 S | 5/2004 | Lofman |
| 6,982,093 B2 | 1/2006 | Licari |
| 7,030,092 B1 | 4/2006 | Levine |
| 7,090,858 B2 | 8/2006 | Jayaraman |
| D568,576 S | 5/2008 | Neidle et al. |
| D585,626 S | 2/2009 | Chappell, Sr. et al. |
| 2002/0012689 A1 | 1/2002 | Stillman |
| 2002/0170567 A1 | 11/2002 | Rizzotto et al. |
| 2002/0197688 A1* | 12/2002 | Pandolfino ............... 435/161 |
| 2003/0224090 A1 | 12/2003 | Pearce et al. |
| 2004/0037879 A1 | 2/2004 | Adusumilli et al. |
| 2004/0118421 A1 | 6/2004 | Hodin et al. |
| 2004/0123873 A1 | 7/2004 | Calandro et al. |
| 2004/0247649 A1 | 12/2004 | Pearce et al. |
| 2004/0247744 A1 | 12/2004 | Pearce et al. |
| 2004/0247746 A1 | 12/2004 | Pearce et al. |
| 2005/0003048 A1 | 1/2005 | Pearce et al. |
| 2005/0061339 A1 | 3/2005 | Hansson et al. |
| 2005/0100640 A1 | 5/2005 | Pearce |
| 2005/0210615 A1 | 9/2005 | Shastry et al. |
| 2005/0244521 A1 | 11/2005 | Strickland et al. |
| 2005/0287249 A1 | 12/2005 | Shukla et al. |
| 2006/0039973 A1 | 2/2006 | Aldritt et al. |
| 2006/0073190 A1 | 4/2006 | Carroll et al. |
| 2006/0118589 A1 | 6/2006 | Arnarp et al. |
| 2006/0191548 A1 | 8/2006 | Strickland et al. |
| 2006/0204598 A1 | 9/2006 | Thompson |
| 2006/0228431 A1 | 10/2006 | Eben et al. |
| 2007/0012328 A1 | 1/2007 | Winterson et al. |
| 2007/0062549 A1 | 3/2007 | Holton, Jr. et al. |
| 2007/0095356 A1 | 5/2007 | Winterson et al. |
| 2007/0122526 A1 | 5/2007 | Sweeney et al. |
| 2007/0186941 A1 | 8/2007 | Holton, Jr. et al. |
| 2007/0186942 A1 | 8/2007 | Strickland et al. |
| 2007/0186943 A1 | 8/2007 | Strickland et al. |
| 2007/0186944 A1 | 8/2007 | Strickland et al. |
| 2007/0190157 A1 | 8/2007 | Sanghvi et al. |
| 2007/0207239 A1 | 9/2007 | Neidle et al. |
| 2007/0261707 A1 | 11/2007 | Winterson et al. |
| 2007/0267033 A1 | 11/2007 | Mishra et al. |
| 2007/0298061 A1 | 12/2007 | Boghani et al. |
| 2008/0014303 A1 | 1/2008 | Jacops et al. |
| 2008/0029110 A1 | 2/2008 | Dube et al. |
| 2008/0029116 A1 | 2/2008 | Robinson et al. |
| 2008/0029117 A1 | 2/2008 | Mua et al. |
| 2008/0081071 A1 | 4/2008 | Sanghvi et al. |
| 2008/0166395 A1 | 7/2008 | Roush |
| 2008/0173317 A1 | 7/2008 | Robinson et al. |
| 2008/0196730 A1 | 8/2008 | Engstrom et al. |
| 2008/0202536 A1 | 8/2008 | Torrence et al. |
| 2008/0302682 A1 | 12/2008 | Engstrom et al. |
| 2008/0308115 A1 | 12/2008 | Zimmerman et al. |
| 2009/0004329 A1 | 1/2009 | Gedevanishvili et al. |
| 2009/0022856 A1 | 1/2009 | Cheng et al. |
| 2009/0022917 A1 | 1/2009 | Gedevanishvili et al. |
| 2009/0025738 A1 | 1/2009 | Mua et al. |
| 2009/0025739 A1 | 1/2009 | Brinkley et al. |
| 2009/0025740 A1 | 1/2009 | Chappell, Sr. et al. |
| 2009/0025741 A1 | 1/2009 | Crawford et al. |
| 2009/0126746 A1 | 5/2009 | Strickland et al. |
| 2010/0218779 A1 | 9/2010 | Zhuang et al. |
| 2010/0300464 A1 | 12/2010 | Gee et al. |
| 2010/0300465 A1 | 12/2010 | Zimmerman |
| 2011/0083680 A1 | 4/2011 | Mishra et al. |

FOREIGN PATENT DOCUMENTS

| | | |
|---|---|---|
| EP | 0245575 | 11/1987 |
| EP | 0145499 | 4/1989 |
| EP | 0483500 A1 | 5/1992 |
| EP | 0 422 898 | 9/1994 |
| EP | 0 599 425 | 10/1997 |
| GB | 924052 | 4/1963 |
| GB | 1350740 | 4/1974 |
| JP | 03-240665 | 10/1991 |
| WO | WO 94/25356 | 11/1994 |
| WO | WO 97/45336 | 12/1997 |
| WO | WO 99/40799 | 8/1999 |
| WO | WO 00/57713 | 10/2000 |
| WO | WO01/70591 A1 | 9/2001 |
| WO | WO02/080707 A1 | 10/2002 |
| WO | WO 2004/056218 * | 7/2004 |
| WO | WO 2004/056219 | 7/2004 |
| WO | WO2004/064811 A1 | 8/2004 |
| WO | WO 2004/095959 A1 | 11/2004 |
| WO | WO 2005/003178 * | 1/2005 |
| WO | WO 2005/046363 A | 5/2005 |
| WO | WO 2005/077232 | 8/2005 |
| WO | WO 2006/004480 A1 | 1/2006 |
| WO | WO 2006/039487 A | 4/2006 |
| WO | WO 2006/065192 A1 | 6/2006 |
| WO | WO 2006/105173 A2 | 10/2006 |
| WO | WO 2006/120570 * | 11/2006 |
| WO | WO2006/120570 A2 | 11/2006 |
| WO | WO 2006/127772 A | 11/2006 |
| WO | WO 2007/037962 A | 4/2007 |
| WO | WO 2007/057789 A2 | 5/2007 |
| WO | WO 2007/057791 A2 | 5/2007 |
| WO | WO 2007/082599 A1 | 7/2007 |
| WO | WO2007/126361 A1 | 11/2007 |
| WO | WO 2008/016520 A2 | 2/2008 |
| WO | WO2008/104891 A2 | 9/2008 |

OTHER PUBLICATIONS

Leffingwell, J.C. et al., Tobacco Flavoring for Smoking Products, R.J.Reynolds Tobacco Copmpany 1972 [on line], Retrieved from the internet. Retrieved on Dec. 3, 2010 from URL: <http://legacy.library.ucsf.edu/tid/yvz80a00/pdf>.*

International Preliminary Report on Patentability issued Dec. 11, 2009 for PCT/1132008/002598.

International Search Report and Written Opinion mailed Jan. 30, 2009 for PCT/IB2008/002598.

Dietary Guidelines for Americans 2005 published by the United States Department of Agriculture and the Department of Health and Human Services.

U.S. Appl. No. 12/748,205, filed Mar. 26, 2010.

Satel, Sally M.D., "A Smokeless Alternative to Quitting," Apr. 6, 2004, The New York Times, Accessed Oct. 25, 2010; http://query.nytimes.com/gst/fullpage.html?res=9402EFD91E39F935A35757C0A9629C8B63.

* cited by examiner

ORAL POUCH PRODUCT INCLUDING SOLUBLE DIETARY FIBERS

CROSS REFERENCE TO RELATED APPLICATION

This application claims priority under 35 U.S.C. §119(e) to U.S. provisional Application No. 60/929,015, filed on Jun. 8, 2007, the entire content of which is incorporated herein by reference.

SUMMARY

Provided is an oral pouch product including soluble dietary fibers so as to provide a portion of soluble dietary fibers. Preferably, the oral pouch is a porous pouch having soluble dietary fibers contained within the pores of the pouch or as a coating thereon. The pouch contains botanicals for oral enjoyment.

DETAILED DESCRIPTION

Complex carbohydrates are composed of simple sugar units in long chains called polymers or polysaccharides. Dietary fiber is a type of complex carbohydrate that is important in human nutrition. Dietary fiber is classified either as insoluble fibers, which do not dissolve in water, and soluble dietary fibers, which dissolve or swell in water. Soluble dietary fibers, such as pectins, mucilages, methylcellulose, and gums, are not broken down by human enzymes.

As the soluble dietary fibers passes through the gastrointestinal tract, the soluble dietary fibers bind to dietary cholesterol to aid in its elimination from the body. Foods high in soluble dietary fibers include oat bran, oatmeal, beans, peas, barley and citrus fruits.

The techniques for isolating soluble dietary fibers from plants have been sufficiently developed to permit soluble dietary fibers to be commercially produced and packaged.

Figure 1:
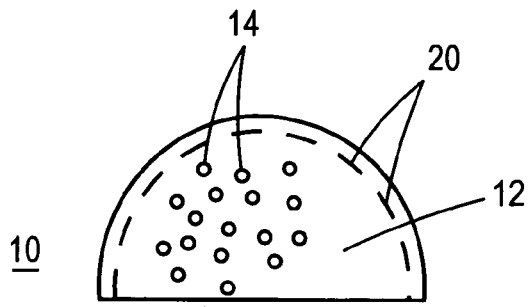
FIG. 1 is an illustration of a pouch product formed from a pouch material having a plurality of pores filled with soluble dietary fibers.

As described herein and shown in FIG. 1, an oral pouch product 10 includes a pouch 12 having a plurality of pores 14 and a botanical material 18 contained within the pouch 12. In a preferred embodiment, soluble dietary fibers 16 fills the pores 14 of the pouch 12 so as to provide a consumer with a portion of soluble fibers. In another embodiment, a layer of soluble fibers 16 forms a coating 22 on the pouch 12. Preferably, the oral pouch product 10 is a flavored oral pouch product 10 that can be placed in the mouth so that a user can suck, chew, and otherwise manipulate the pouch 10 so as to release the dietary soluble fibers 16 and flavors contained therein. In an embodiment, the oral pouch product 10 can be placed in the mouth and held therein without movement.

In a preferred embodiment, as illustrated in FIG. 1, the pouch product 10 includes a pouch 12 having a plurality of pores 14. Preferably, the plurality of pores 14 are inherent in the material used to form the pouch 12. In other embodiments, the plurality of pores 14 may be formed in a pouch 12 made of a non-porous material.

Figure 2:
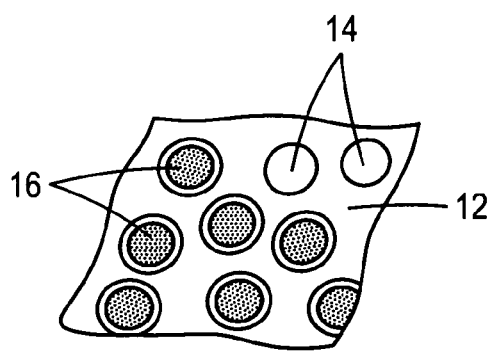
FIG. 2 is an enlarged view of a pouch material having pores filled with soluble dietary fibers.

As shown in FIG. 2, in a preferred embodiment, the plurality of pores 14 are filled with soluble fibers 16 so that the pouch product 10 provides a portion of soluble fibers 16 to a consumer. Preferably, the soluble fibers 16 are also provided by botanical material 18 contained within the pouch 12.

Preferably, a portion of soluble fibers 16 provides about 0.01% to about 100% of a user's daily recommended soluble fibers intake. More preferably, a portion of soluble fibers 16 provides about 0.01% to about 20% of a user's daily recommended soluble fibers intake (e.g., about 1% to about 15% or about 2% to about 10%). Also preferably, the pouch product 10 includes at least about 0.75 grams of soluble fibers. Typically, the recommended dietary fibers intake is about 14 g for every 1,000 calories as established by the *Dietary Guidelines for Americans* 2005 published by the United States Department of Agriculture and the Department of Health and Human Services.

Preferably, the fibers 16 in the pouch product 10 dissolve slowly in the oral cavity. In an embodiment, the soluble fibers 16 can be cross-linked to alter the rate of dissolution.

Preferably, the pouch product 10 can be formed in any shape. Preferred shapes for the pouch product 10 include any shape selected from the group consisting of polygons, squares, rectangles, circles, ovals, heart, star, half-moon, crescent, leaf shapes, and combinations thereof.

In a preferred embodiment, an oral pouch product is sized and configured to fit inside the mouth, between a user's cheek and gum. Preferably, the pouch product 10 is about 10 mm to about 35 mm long, about 10 mm to about 35 mm wide and about 3 mm to about 10 mm thick.

Preferably, the pouch 12 is made of a porous material such as that used to construct filter paper, tea bags, coffee filters, and the like. Preferably, the pouch 12 is made of a material suitable for contact with food, such as materials used for packaging and/or handling foods. Also preferably, the pouch 12 has a plurality of pores 14 therein.

Figure 3:
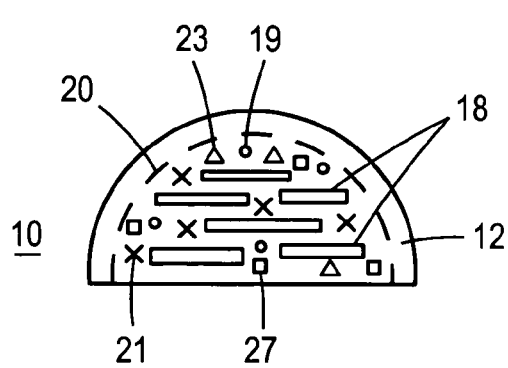
FIG. 3 is a cross-sectional view of the pouch product of FIG. 1.

Referring now to FIG. 3, in a preferred embodiment, the pouch 12 encloses a botanical material 18. As used herein, the term "botanical" includes anything derived from plants including, but not limited to, extracts, leaves, fibers, stems, roots, seeds, flowers, fruits, pollen, and the like. Preferred botanicals include tobacco, coffee, tea, herbs, spices, vegetable fibers, fruit fibers, and combinations thereof.

Exemplary tobacco materials can be made of cut or ground tobacco and can include flavor additives and/or humectants. Examples of suitable types of tobacco materials that may be used include, but are not limited to, flue-cured tobacco, Burley tobacco, Maryland tobacco, Oriental tobacco, rare tobacco, specialty tobacco, reconstituted tobacco, genetically modified tobacco, blends thereof and the like. Preferably, the tobacco is pasteurized. In another embodiment, the tobacco is fermented.

In an embodiment, the soluble fibers 16 can be derived from tobacco.

In a preferred embodiment, humectants 23 can be added to the botanical material 18 to help maintain the moisture levels in the pouch product 10. Examples of humectants 23 that can be used with the botanical material 18 include glycerin and propylene glycol.

In an embodiment, the pouch 12 can also enclose flavorants 19, sweeteners 21, and other additives 27 such as vitamins, minerals, anti-microbial agents, neutraceuticals, energizing agents, soothing agents, chemesthesis agents, and combinations thereof.

In a preferred embodiment, the pouch product 10 can also include anti-microbial agents. Preferably, the anti-microbial agents are added to the botanical material 18 to aid in the prevention of spoilage and to lengthen the shelf-life of the oral pouch product 10.

In an embodiment, suitable sweeteners 21 include, without limitation, water soluble sweeteners such as monosaccharides, disaccharides, and polysaccharides such as xylose, ribose, sucrose, maltose, fructose, glucose, and mannose. In an embodiment, the sweetener can be a sugar alcohol, such as xylitol.

Preferably, the soothing agents provide a soothing sensation to the throat and oral cavity. Suitable soothing agents include, without limitation, chamomile, lavender, jasmine, and the like.

Preferably, the energizing ingredients or vitamins include, without limitation, caffeine, taurine, guarana, vitamin B6, vitamin B12, and the like. Suitable chemesthesis ingredients provide, without limitation, hot, spicy, or cooling flavors such as mint, menthol, cinnamon, pepper, and the like.

In an embodiment, flavorants 19 can be applied to the enclosed botanical material 18 and/or the pouch 12 to provide immediate release of flavor once the oral product 10 is placed in the user's mouth. Preferably, less than about 1 mg to about 100 mg of a flavorant 19 is added to the botanical material 18 and/or the pouch 12. The amount of flavorant 19 added can depend on the potency of the flavorant 19 being added.

Suitable flavorants 19 include any flavorants commonly used in foods, confections, or other oral products. Exemplary flavorants include, but are not limited to, berry flavors such as pomegranate, acai, raspberry, blueberry, strawberry, boysenberry, and/or cranberry. Other suitable flavorants include, without limitation, any natural or synthetic flavor or aroma, such as menthol, peppermint, spearmint, wintergreen, bourbon, scotch, whiskey, cognac, hydrangea, lavender, chocolate, licorice, citrus and other fruit flavors, such as apple, peach, pear, kiwi, cherry, plum, orange, lime, grape, lemon, kumquat, and grapefruit, gamma octalactone, vanillin, ethyl vanillin, breath freshener flavors, butter, rum, coconut, almond, pecan, walnut, hazelnut, French vanilla, macadamia, sugar cane, maple, cassis, caramel, banana, malt, espresso, kahlua, white chocolate, spice flavors such as cinnamon, clove, cilantro, basil, oregano, garlic, mustard, nutmeg, rosemary, thyme, tarragon, dill, sage, anise, and fennel, methyl salicylate, linalool, jasmine, coffee, olive oil, sesame oil, sunflower oil, bergamot oil, geranium oil, lemon oil, ginger oil, balsamic vinegar, rice wine vinegar, and red wine vinegar. In addition, the flavorants can include cocktail flavors, such as cosmopolitan, martini, margarita, manhattan, piña colada, daiquiri, bellini and the like.

Preferably, the flavorants are applied to the botanical material 18 and/or the pouch 12 by spraying, coating, immersing, embossing, and/or dispersing. In an embodiment, the flavorants are added in the form of spray dried flavorants, essential oils, encapsulated flavorants, coascervated flavorants, suspensions, and/or solutions.

When the flavorants are encapsulated, the flavorants also include controlled release mechanisms such as pH change, heat activation, or mechanical activation through manipulating or sucking. In addition, encapsulated flavorants can have coatings of various thicknesses so that the flavorants are released at varying rates to provide continuous flavor throughout use of the oral product.

Preferably, the soluble fibers 16 dissolve out of the pores 14 upon placement in the mouth, leaving the pores of the pouch 12 open to allow the flavors of the botanical materials 18 and/or flavorants to exit the pouch 12 and provide flavor.

In a preferred embodiment, coloring agents are included in the botanical material 18 and/or the pouch 12. One or more coloring agents may change the color of the pouch and/or botanical materials to create designs, patterns, a trademark, or to signify pouch flavor. (i.e. purple to signify grape flavor)

In a preferred embodiment, as illustrated in FIG. 3, the pouch product 10 includes a pouch 12 having a seal 20 and a coating 22. Preferably, the coating 22 includes soluble dietary fibers that provide a portion of soluble fibers.

As seen in FIG. 3, the pouch product 10 can be in a half-moon shape and can include a single sheet of pouch material 12 folded over to create a first layer and a second layer with the inner material in between the layers. A single seal 14 can seal the botanical material 18 within the pouch 10.

Figure 4:
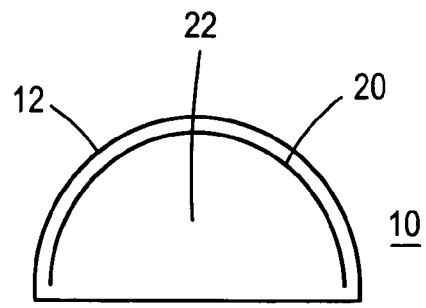
FIG. 4 is an illustration of an embodiment of a pouch product having a coating including soluble dietary fibers.

As illustrated in FIG. 4, the pouch product 10 can be made from a circular piece of pouch material, which is filled, or the first layer and second layer can be separate pieces of pouch material 12 with the inner material placed there between. A single seal 14 circumscribes the enclosed inner material.

Figure 5:
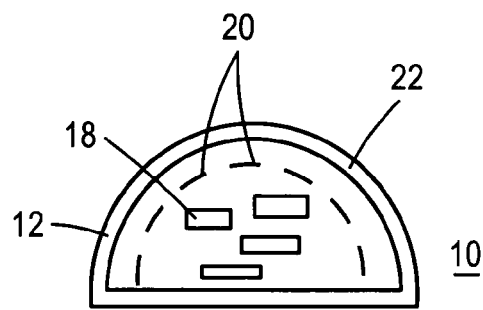
FIG. 5 is a cross-sectional view of the pouch product of FIG. 4.

Referring now to FIG. 5, in an embodiment, the pouch product 10 includes a coating 22 on the pouch 12 that is filled with a botanical material 18. The coating 22 can cover the entire pouch 12 or a portion thereof.

Figure 6:
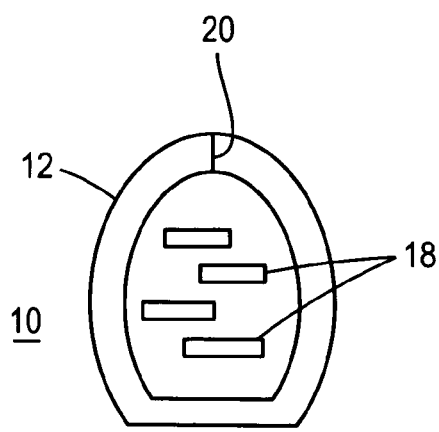
FIG. 6 is a cross-sectional view of the pouch product of FIG. 1.

Also provided is a method of making a pouch product 10. Preferably, the botanical material 18 is placed between a first layer 30 and a second layer 32, as seen in FIG. 6, of the pouch 12. A seal 20 is formed between the two layers 30, 32 around the enclosed botanical material 18 to form the pouch product 10.

Sealing is accomplished by any suitable sealing method, such as, for example, adhesive or mutual sealing. Mutual sealing may be thermal or sonic. Preferably, sealing is accomplished by thermal sealing.

In one embodiment, after sealing the pouch, a soluble fibers coating is applied to the pouch 12. In another embodiment, prior to placing the botanical material between the first layer 30 and the second layer 32, a quantity of soluble fibers 16 is placed in the pores of the pouch 12.

In a preferred embodiment, the soluble fibers can be applied to the pouch directly as a dry powder or as a paste, gel, and/or the like. The paste can be formed by mixing with another carrier to give it a consistency that will permit the fiber to maintain its attachment to the pouch material during shipping and then slowly dissolve in the mouth. For example, a paste as mixed with another liquid is one type of form that can be applied to the pouch. The addition of another molecule to the paste can help the fibers to remain attached to the pouch, while still retaining the dissolvability of the fibers in the mouth. In another embodiment, the soluble dietary fibers can be dispersed or dissolved in a liquid, with or without another carrier. The dissolved and/or dispersed soluble dietary fibers, with or without an attachment molecule, can be sprayed (aerosolized) into the holes of the pouch material. In an embodiment, the dissolved and/or dispersed soluble dietary fibers, with or without an attachment molecule, can be sprayed (aerosolized) onto the entire outer and/or inner surface of the pouch material.

The oral pouch product 10 can be used for about 1 minute to about 2 hours (e.g., about 1 minute to about 10 minutes, about 5 minutes to about 20 minutes, about 10 minutes to about 30 minutes, about 15 minutes to about 45 minutes, about 20 minutes to about 55 minutes, about 30 minutes to about 1 hour, about 45 minutes to about 1 hour and 15 minutes, about 1 hour to about 1 hour and 30 minutes or about 1 hour and 30 minutes to about 2 hours.

In use, the pouch product 10 can be placed in the mouth. The saliva initially dissolves the soluble fibers 16 contained in the pores 14. Once the soluble fibers dissolve 16, the pores 14 are open to allow saliva to enter the pouch and juices from the botanical material 18 and additives to exit the pouch 12.

Preferably, flavor is delivered to the user throughout use. Flavor perception can be changed by altering the use of the oral pouch product 10. For example, a user can hold the pouch product 10 in the mouth and allow flavors to be released slowly by movement of saliva into and out of the pouch. The user can also chew or otherwise manipulate the pouch product 10, which can cause a burst of flavor to be released therefrom. Such flavor bursts can be intermittent during use if a user chooses to intermittently chew the pouch product 10. Thus, the pouch product 10 provides multiple flavor experiences.

While the foregoing has been described in detail with reference to specific embodiments thereof, it will be apparent to one skilled in the art that various changes and modifications may be made, and equivalents thereof employed, without departing from the scope of the claims.

We claim:

1. An oral pouch product comprising:
   a pouch including a plurality of pores;
   a coating on an external surface of the pouch, said coating consisting of a portion of soluble dietary fibers; and
   an inner filling material including a botanical material contained within said pouch,
   wherein said portion of soluble dietary fibers includes at least about 0.75 g of soluble dietary fibers, and wherein said oral pouch product is adapted to be chewed, sucked, and/or orally manipulated in a user's mouth.

2. The oral pouch product of claim 1, wherein said portion includes about 1% to about 15% of a consumer's daily soluble dietary fibers needs.

3. The oral pouch product of claim 1, wherein said portion includes about 0.01% 2% to about 20% 10% of a consumer's daily soluble dietary fibers needs.

4. The oral pouch product of claim 1, wherein a portion of the coating at least partially extends into said plurality of pores of the pouch.

5. The oral pouch product of claim 1, wherein the inner filling material includes humectants therein.

6. The oral pouch product of claim 1, wherein said pouch product further includes colorants.

7. The oral pouch product of claim 1, wherein said botanical material includes botanical fibers, botanical particles, botanical powders, botanical extracts, botanical granules, botanical beads, botanical capsules, botanical microcapsules, and combinations thereof.

8. The oral pouch product of claim 1, wherein said pouch product includes at least one flavorant.

9. The oral pouch product of claim 8, wherein said at least one flavorant comprises microencapsulated beads providing controlled release of the flavorants.

10. The oral pouch product of claim 8, wherein said at least one flavorant is added in an amount of about 0.1% to about 5% by weight of the botanical material.

11. The oral pouch product of claim 1, wherein said botanical material includes tobacco and/or non-tobacco, plant material fibers, of tea, spice, herb, fruit, and/or vegetable fibers.

12. The oral pouch product of claim 1, wherein said pouch product has dimensions of about 10 mm to about 35 mm long, about 10 mm to about 35 mm wide and about 3 mm to about 10 mm thick.

13. The oral pouch product of claim 1, wherein said pouch product further includes sweeteners.

14. The oral pouch product of claim 1, wherein said portion of soluble dietary fibers is derived from tobacco.

15. A method of making an oral pouch product comprising:
   placing a material consisting of soluble dietary fibers in pores of a porous material;
   forming an open pouch from a cellulosic material;
   filling said pouch with a botanical material; and
   sealing said pouch to enclose said botanical material and form an oral pouch product,
   wherein said oral pouch product includes at least about 0.75 g of soluble dietary fibers, and wherein said oral pouch product is adapted to be chewed, sucked, and/or orally manipulated in a user's mouth.

16. A method of making an oral pouch product comprising:
   forming an open pouch from a porous material;
   filling said pouch with a botanical material;
   sealing said pouch to enclose said botanical material to form a closed pouch; and
   coating said closed pouch with an external coating consisting of soluble dietary fibers to form an oral pouch product,
   wherein said oral pouch product includes at least about 0.75 g of soluble dietary fibers, and wherein said oral pouch product is adapted to be chewed, sucked, and/or orally manipulated in a user's mouth.

17. A method of making the oral pouch product of claim 1 comprising at least partially coating the pouch with soluble dietary fibers to form a coated oral pouch product.

18. A method of making the oral pouch product of claim 1 comprising filling said plurality of pores with a coating containing soluble dietary fibers.

* * * * *